United States Patent
Hecht et al.

(10) Patent No.: US 10,906,106 B2
(45) Date of Patent: Feb. 2, 2021

(54) MODULAR TURNING TOOL HAVING A REPLACEABLE ADAPTOR

(71) Applicant: Iscar, Ltd., Tefen (IL)

(72) Inventors: Gil Hecht, Nahariya (IL); Asaf Malka, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 29 days.

(21) Appl. No.: 16/199,458

(22) Filed: Nov. 26, 2018

(65) Prior Publication Data

US 2019/0160550 A1    May 30, 2019

Related U.S. Application Data

(60) Provisional application No. 62/592,808, filed on Nov. 30, 2017.

(51) Int. Cl.
| | |
|---|---|
| *B23B 29/00* | (2006.01) |
| *B23B 29/04* | (2006.01) |
| *B23B 27/08* | (2006.01) |
| *B23B 27/04* | (2006.01) |

(52) U.S. Cl.
CPC ............ *B23B 29/043* (2013.01); *B23B 27/04* (2013.01); *B23B 27/08* (2013.01); *B23B 29/046* (2013.01); *B23B 2205/02* (2013.01); *B23B 2210/08* (2013.01)

(58) Field of Classification Search
CPC ....... B23B 27/04; B23B 27/08; B23B 29/043; B23B 29/046; B23B 2205/02; B23B 2210/08
See application file for complete search history.

(56) References Cited

U.S. PATENT DOCUMENTS

| | | |
|---|---|---|
| 4,938,641 A | 7/1990 | Maier |
| 5,709,508 A * | 1/1998 | Barazani ............... B23B 27/045 407/101 |
| 6,186,704 B1 | 2/2001 | Hale |
| 6,270,294 B1 * | 8/2001 | Sjoo ...................... B23B 27/045 407/101 |
| 7,217,068 B2 | 5/2007 | Oettle |
| 7,419,337 B2 | 9/2008 | Berminge |
| 2004/0247404 A1 | 12/2004 | Oettle |
| 2007/0207671 A1 | 9/2007 | Nagaya et al. |

OTHER PUBLICATIONS

International Search Report dated Mar. 13, 2019, issued in PCT counterpart application (No. PCT/IL2018/051261).
Written Opinion dated Mar. 13, 2019, issued in PCT counterpart application (No. PCT/IL2018/051261).

* cited by examiner

*Primary Examiner* — Nicole N Ramos
(74) *Attorney, Agent, or Firm* — Womble Bond Dickinson (US) LLP

(57) ABSTRACT

A turning tool adaptor includes opposite first and second side surfaces and a peripheral surface which extends therebetween. The turning tool adaptor further includes a cutting portion with an insert retaining portion and a clamping portion which extends from the cutting portion. The clamping portion includes a protrusion which extends transversely from the first side surface. The protrusion includes a main abutment surface and spaced apart first and second adaptor clamping bores which open out to the second side surface and also to the main abutment surface. The turning tool adaptor has first, second and third abutment surfaces which are located between the top and bottom surfaces in a side view perpendicular to one of the side surfaces.

35 Claims, 3 Drawing Sheets

MODULAR TURNING TOOL HAVING A REPLACEABLE ADAPTOR

RELATED APPLICATIONS

This application claims priority to U.S. Provisional Patent Application No. 62/592,808 filed 30 Nov. 2017, the contents of which are incorporated by reference in their entirety.

FIELD OF THE INVENTION

The subject matter of the present application relates to turning tools. In particular, the present application relates to coupling arrangement for turning tools having a modular replaceable adaptor, forming a cutting head and carrying a cutting insert.

BACKGROUND OF THE INVENTION

U.S. Pat. No. 7,217,068 discloses a modular turning tool with a replaceable adaptor.

SUMMARY OF THE INVENTION

In accordance with a first aspect of the subject matter of the present application there is provided a turning tool adaptor having a longitudinal axis defining a forward-to-rear direction, and comprising:

an adaptor forward end and an adaptor rear end spaced apart from one another along the longitudinal axis;

opposite first and second side surfaces and a peripheral surface extending therebetween;

a forward cutting portion comprising an insert retaining portion; and a clamping portion located rearward of the cutting portion, the clamping portion comprising:

opposite top and bottom surfaces extending between the first side surface and a main abutment surface which extends parallel to the second side surface; and a protrusion extending transversely from the first side surface, and comprising:

the main abutment surface;

first and second adaptor clamping bores opening out to the second side surface and to the main abutment surface;

a first abutment surface facing in an upward direction, away from the bottom surface;

a second abutment surface extending parallel to, and located forward of, the first abutment surface; and a third abutment surface located rearward of the first abutment surface, and forming a non-zero surfaces angle therewith, wherein:

the first, second and third abutment surfaces are located between the top and bottom surfaces in a side view perpendicular to the main abutment surface.

In accordance with a second aspect of the subject matter of the present application there is provided a turning tool adaptor, having a longitudinal axis defining a forward-to-rear direction and comprising:

an adaptor forward surface and an adaptor rear surface spaced apart from one another along the longitudinal axis;

opposite first and second side surfaces and a peripheral surface extending therebetween;

a cutting portion comprising an insert retaining portion; and a clamping portion, extending from the cutting portion, and comprising a protrusion extending transversely to the longitudinal axis from the first side surface, the protrusion comprising a first adaptor clamping bore and a second adaptor clamping bore spaced apart from the first adaptor clamping bore, the adaptor clamping bores opening out to the protrusion and to the second side surfaces;

wherein the first and second adaptor clamping bores have elongated, non-circular cross sections.

In accordance with a third aspect of the subject matter of the present application there is provided a turning tool adaptor, having a longitudinal axis defining opposite forward and rearward direction, the turning tool adaptor comprising:

a first side surface, a second side surface, and a peripheral surface extending there between;

a cutting portion comprising an insert retaining portion, and having a first width extending between the first side surface and the second side surface in a direction transverse to the longitudinal axis; and a clamping portion, located rearward of the cutting portion, and having a second width extending between the first side surface and the second side surface in a direction transverse to the longitudinal axis, the clamping portion comprising a first adaptor clamping bore and a second adaptor clamping bore spaced apart from the first adaptor clamping bore, the adaptor clamping bores opening out to the first and second side surfaces;

wherein the first adaptor clamping bore has a non-cylindrical first cross section defining a first elongated dimension and a transverse first short dimension, shorter than the first elongated dimension;

the second adaptor clamping bore has a non-cylindrical second cross section defining a second elongated dimension and a transverse second short dimension, shorter than the second elongated dimension.

In accordance with a fourth aspect of the subject matter of the present application there is provided a turning tool comprising:

a tool holder body comprising an adaptor receiving portion located on an adaptor receiving surface, the adaptor receiving portion having a first body clamping bore and a second body clamping bore opening out to the adaptor receiving surface, the first body clamping bore having a first bore axis and the second body clamping bore having a second bore axis;

a turning tool adaptor coupled with the tool holder body, the turning tool adaptor having a longitudinal axis defining opposite forward and rearward directions, the turning tool adaptor comprising:

a first side surface, a second side surface, and a peripheral surface extending there between;

a cutting portion comprising an insert retaining portion, and having a first width extending between the first side surface and the second side surface in a direction transverse to the longitudinal axis; and a clamping portion, located rearward of the cutting portion, and having a second width extending between the first side surface and the second side surface in a direction transverse to the longitudinal axis, the clamping portion comprising a first adaptor clamping bore and a second adaptor clamping bore spaced apart from the first adaptor clamping bore, the adaptor clamping bores opening out to the first and second side surfaces; and a first fastener passing through the first adaptor clamping bore and through the first body clamping bore;

a second fastener passing through the second adaptor clamping bore and through the second body clamping bore;

wherein the first adaptor clamping bore has a non-cylindrical first cross section defining a first elongated dimension and a transverse first short dimension, shorter than the first elongated dimension;

the second adaptor clamping bore has a non-cylindrical second cross section defining a second elongated dimension and a transverse second short dimension, shorter than the second elongated dimension.

Any of the following features, either alone or in combination, may be applicable to any of the above aspects of the subject matter of the application:

The first, second and third abutment surfaces are all located between the second side surfaces and the main abutment surface in a side view perpendicular to the main abutment surface.

The first, second and third abutment surfaces are all located between the first side surfaces and the main abutment surface in a direction perpendicular thereto.

The clamping portion further includes:

a first abutment surface;

a second abutment surface extending parallel to, and located forward of, the first abutment surface; and a third abutment surface located rearward of the first abutment surface, and forming a non-zero surfaces angle therewith.

The surfaces angle can be larger than 90 degrees, and in particular equals 91 degrees.

The peripheral surface has a top surface and a bottom surface, which are, in a side view of the turning tool adaptor taken perpendicular to the longitudinal axis, located on opposite sides of the longitudinal axis, and the first abutment surface is parallel to the top surface, and located between the top surface and a longitudinal extension of the second abutment surface.

The top surface and the bottom surface can be parallel, and the first abutment surface is located closer to the top surface than to the bottom surface.

The first elongated dimension forms a non-zero clamping bore angle with the second elongated dimension.

The clamping bore angle can be 90 degrees.

The first width is smaller than the second width.

The peripheral surface has a top surface and a bottom surface, which are located on opposite sides of the longitudinal axis, and in a direction perpendicular to the longitudinal axis the adaptor clamping bores are located between the top and bottom surfaces.

The first elongated dimension and the first short dimension intersect at a first adaptor bore axis, the second elongated dimension and the second short dimension intersect at a second adaptor bore axis.

The first adaptor bore axis is parallel to-, and spaced apart from, the first bore axis, and the second adaptor bore axis is parallel to-, and spaced apart from, the second bore axis.

The adaptor receiving portion further includes:

a first receiving surface;

a second receiving surface extending parallel to-, and located forward of-, the first receiving surface; and a third receiving surface located rearward of the first receiving surface, and forming a non-zero receiving angle therewith The clamping portion further includes:

a first abutment surface;

a second abutment surface extending parallel to-, and located forward of-, the first abutment surface; and a third abutment surface located rearward of the first abutment surface, and forming a non-zero surfaces angle therewith.

The first abutment surface abuts the first receiving surface; the second abutment surface abuts the second receiving surface; and the third abutment surface abuts the third receiving surface.

The surfaces angle is preferably larger than 90 degrees.

BRIEF DESCRIPTION OF THE DRAWINGS

For a better understanding of the subject matter of the present application and to show how the same may be carried out in practice, reference will now be made to the accompanying drawings, in which.

Figure 1:
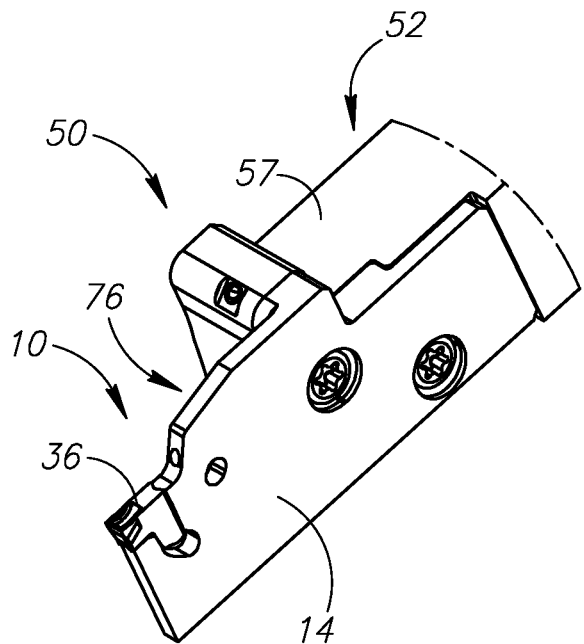
FIG. 1 is an isometric view of a turning tool with a turning tool adaptor.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
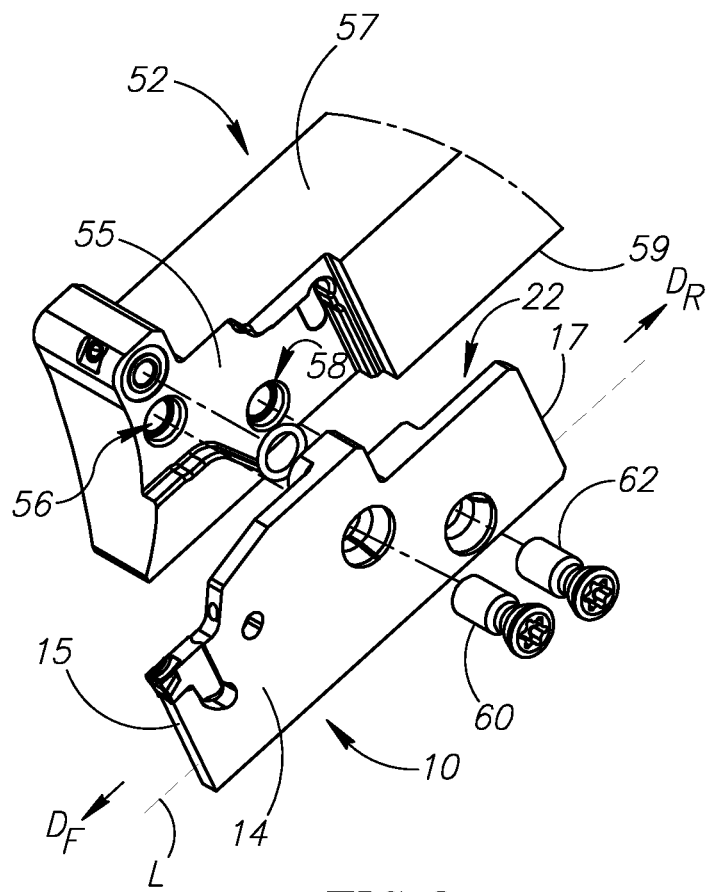
FIG. 2 is an exploded isometric view of the turning tool of FIG. 1.

Attention is drawn to FIGS. 1 and 2. According to an embodiment of the present invention, there is provided a turning tool 50. The turning tool 50 has a tool holder body 52 with an adaptor receiving portion 54 located on an adaptor receiving surface 55 of the tool holder body 52.

The tool holder body 52 has opposite holder top and bottom surfaces 57, 59. According to the present embodiments, the holder top and bottom surfaces 57, 59 are planar and parallel.

The adaptor receiving portion 54 has a first body clamping bore 56 and a second body clamping bore 58 opening out at least to the adaptor receiving surface 55. The first and second body clamping bores 56, 58 are spaced apart from one another. The first and second body clamping bores 56, 58 are typically threaded bores, each for receiving a respective threaded fastener therethrough. The first body clamping bore 56 is a typically cylindrical bore extending along a first body bore axis A1. The second body clamping bore 58 is a typically cylindrical bore extending along a second bore axis A2. As a non-binding example, the first body bore axis A1 may be parallel to the second body bore axis A2.

Figure 5:
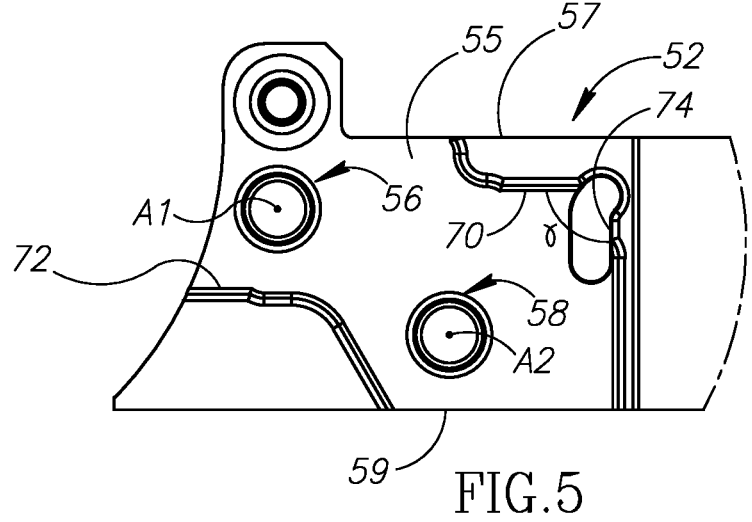
FIG. 5 is a side plan view of a tool holder body.

The adaptor receiving portion 54 further includes a first receiving surface 70; a second receiving surface 72 extending parallel to, and located forward of, the first receiving surface 70; and a third receiving surface 74 located rearward of the first receiving surface 70, and forming a non-zero receiving angle γ therewith. As seen in FIG. 5, the third receiving surface 74 is located lower than the first receiving surface 70 and higher than the second receiving surface 72, in a side plan view of the tool holder body 52. It is understood that the third abutment surface 34 abuts the third receiving surface 74 at a location lower than the first receiving surface 70 and higher than the second receiving surface 72. According to the present embodiment, the first, second and third receiving surfaces 70, 72, 74 extend perpendicularly from the adaptor receiving surface 55. The first, second and third receiving surfaces 70, 72, 74 are located between the holder top and bottom surfaces 57, 59 in a view along any of the first and second body bore axes A1, A2. The first, second and third receiving surfaces 70, 72, 74 are spaced apart from the holder top and bottom surfaces 57, 59 in the same view. Consequently, the tool holder body 52 can have a compact shape, and/or cross section, negating any protrusions or overhangs.

Figure 3:
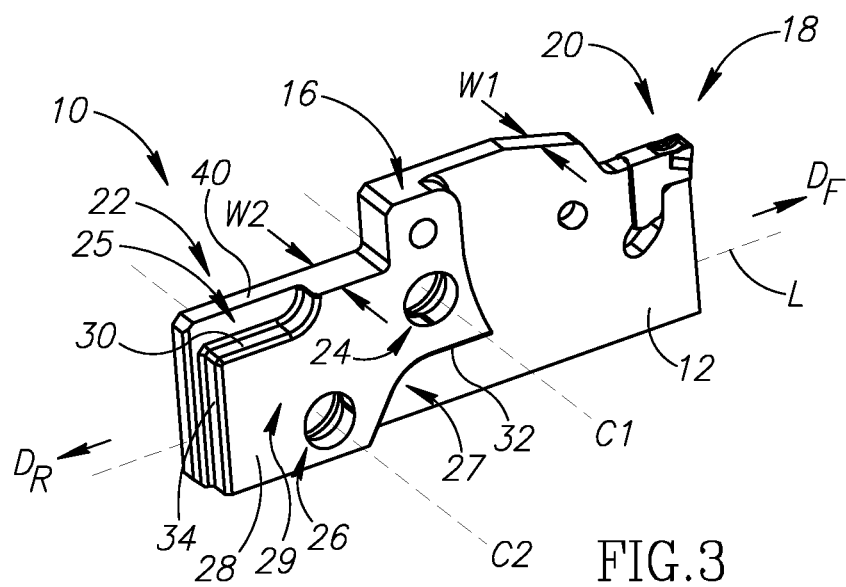
FIG. 3 is an isometric view of the turning tool adaptor of FIG. 1 showing a first side surface thereof.
Figure 4:
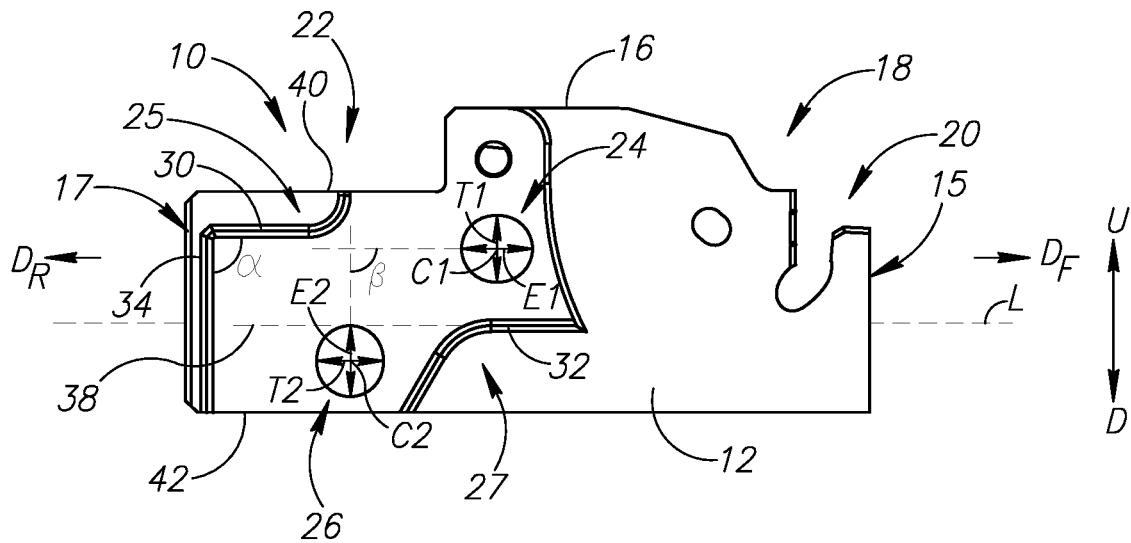
FIG. 4 is a side plan view of the turning tool adaptor of FIG. 1.

Reference is further made to FIGS. 3 and 4, depicting a turning tool adaptor 10 in accordance with an embodiment of the present invention. The turning tool adaptor 10 is coupled with the tool holder body 52, at the adaptor receiving surface 55. The turning tool adaptor 10 is a blade-shaped adaptor, having a longitudinal axis L defining opposite forward and rearward directions DF, DR.

The turning tool adapter 19 has an adaptor forward end 15 and an adaptor rear end 17 which are spaced apart from one another along the longitudinal axis L, and define an overall length of the adaptor. The turning tool adaptor 10 has a first side surface 12, a second side surface 14, and a peripheral surface 16 extending therebetween. As a non-binding example, the first and second side surfaces 12, 14, may be parallel to one another, and to the longitudinal axis L which in the present description passes between the side surfaces 12, 14. The peripheral surface 16 of the turning tool adaptor 10 also has a top surface 40 and a bottom surface 42. As shown in FIG. 4, in a side view of the turning tool adaptor 10 taken perpendicular to the longitudinal axis L, the top surface 40 and the bottom surface 42 are located on opposite sides of the longitudinal axis L, in an upward-to-downward direction U, D of the insert.

The turning tool adaptor 10 has a cutting portion 18 with an insert retaining portion 20, located at the forward end 15 of the turning tool adaptor 10. The cutting portion 18 has a first width W1 extending between the first side surface 12 and the second side surface 14 in a direction transverse to the longitudinal axis L. The insert retaining portion 20 is generally in the form of an insert pocket formed to retain a cutting insert 36, as shown for example in FIGS. 1-3.

The turning tool adaptor 10 further has a clamping portion 22, located rearward of the cutting portion 18. At least a portion of the clamping portion 22 has a second width W2 extending between the first side surface 12 and the second side surface 14, in a direction transverse to the longitudinal axis L.

The first width W1 is smaller than the second width W2. At least a portion of the clamping portion 22 is in the form of a protrusion 29 which extends transversely from the first side surface 12 of the turning tool adaptor 10. The protrusion 29 has a planar main abutment surface 28 which is parallel to the longitudinal axis L. According to the present embodiment, the main abutment surface 28 is parallel to the second side surface 14. Referring to FIG. 3, the protrusion 29 can have a unitary one-piece construction with the remainder of the adaptor 10.

Referring to FIG. 4, the protrusion 29 has first and second abutment recesses 25, 27 on opposite sides thereof. The first abutment recess 25 opens out at least to the top surface 40. The second abutment recess 27 opens out at least to the bottom surface 42. The second abutment recess 27 is located closer to the cutting portion 18 than the first abutment recess 25.

The clamping portion 22 has a first abutment surface 30, a second abutment surface 32, and a third abutment surface 34 which extend along the protrusion 29 from first side surface 12 to the main abutment surface 28. The first abutment surface 30 is located in the first abutment recess 25 and faces in the upward direction U of the insert, away from the bottom surface 42. The second abutment surface 32 is located in the second abutment recess 27 and faces in the downward direction D, away from the top surface 40. As seen in FIG. 4, the entire second abutment surface 32 is located forward of the first abutment surface 30, in a direction along the longitudinal axis L, i.e., the first and second abutment surfaces 30, 32 do not overlap in the forward-rearward directions. According to the present embodiment, the first, second and third abutment surfaces 30, 32, 34 are perpendicular to the main abutment surface 28. The first and second abutment recesses 25, 27 are advantageous because they allow the first, second and third abutment surfaces 30, 32, 34 to be located in between the top and bottom surfaces 40, 42 in a view perpendicular to the main abutment surface 28. The first, second and third abutment surfaces 30, 32, 34 are spaced apart from the top and bottom surfaces 40, 42 in the same view. This contributes to the compactness of the tool, and to preserve a blade-like shape which is needed for some groove and/or parting applications. All the adaptor's 10 abutment surfaces are located inwards, such that it has no overhangs, which makes it easy to clamp, and compatible, with most/all standard CNC machines. Thus, as best seen in FIG. 4, the first and second abutment surfaces 30, 32 are all spaced apart from, and forward of, the adaptor rear end 17.

Figure 8:
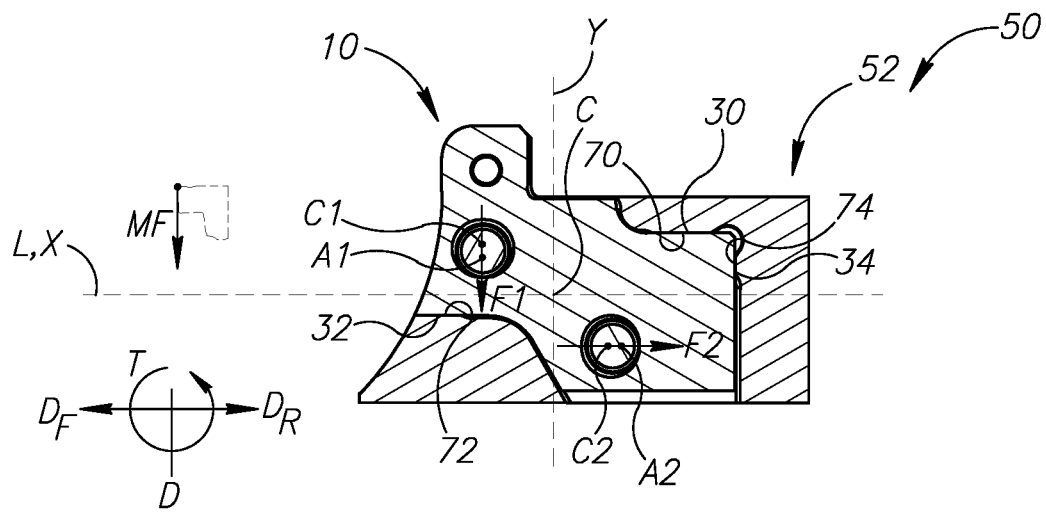
FIG. 8 is a cross-sectional view taken along line VIII-VIII of FIG. 7.

Reference is further made to FIG. 8. In an assembled position of the turning tool, a cross-section is taken along the longitudinal axis L in a view directed from the second side surface 14 towards the first side surface 12. The cross-section passes through the first, second and third abutment surfaces 30, 32, 34. A Cartesian coordinate system is defined by a first axis X and a second axis Y perpendicularly intersecting the first axis X at an origin C. The first axis X coincides with the longitudinal axis L. The first and second abutment surfaces 30, 32 are located in diagonally opposite quadrants of the Cartesian coordinate system. In the current example, the first abutment surface 30 is located in the first quadrant (+,+) and the second abutment surface 32 is located in the third quadrant (−,−).

Attention is drawn to FIG. 4. The second abutment surface 32 preferably extends parallel to the first abutment surface 30. The third abutment surface 34 is located rearward of the first abutment surface 30, and forms an internal non-zero surfaces angle α therewith. According to a non-binding example, the surfaces angle α is larger than 90°. The surfaces angle α is preferably grater that 90.5°, and in one particular embodiment, equals 91°.

According to certain embodiments, the first abutment surface 30 is parallel to the top surface 40, and located between the top surface 40 and a longitudinal extension 38 of the second abutment surface 32.

According to certain embodiments, the top surface 40 and the bottom surface 42 are parallel to one another, and the first abutment surface 30 is located closer to the top surface 40 than to the bottom surface 42.

The clamping portion 22 has a first adaptor clamping bore 24 and a second adaptor clamping bore 26 spaced apart from one another. The first and second adaptor clamping bores 24, 26 open out to both of the first and second side surfaces 12, 14. Specifically, the first and second adaptor clamping bores 24, 26 open out to the protrusion 29, at the main abutment surface 24. The first and second adaptor clamping bores 24, 26 open out to the protrusion 29 at the same distance from the second side surface 14 in a direction perpendicular to the longitudinal axis L. This is advantageous since it can prevent unwanted torque being developed about an axis parallel to the longitudinal axis L.

The first and second adaptor clamping bores 24, 26 are located in diagonally opposite quadrants of the Cartesian coordinate system of FIG. 8. In the current example, the first adaptor clamping bore 24 is located in the second quadrant (−,+) and the second adaptor clamping bores 26 is located in the fourth quadrant (+,−).

Attention is drawn to FIG. 8. The first adaptor clamping bore 24 has a non-circular first cross section, which defines a first elongated dimension E1 and a first short dimension T1. The first short dimension T1 is shorter than the first elongated dimension E1, and extends transversely thereto. The first elongated dimension E1 and the first short dimension T1 intersect at a first adaptor bore axis C1. In a non-binding example, the first elongated dimension E1 and the first short dimension T1 are perpendicular to one another.

Similarly, the second adaptor clamping bore 26 has a non-cylindrical second cross section defining a second elongated dimension E2 and a second short dimension T2. The second short dimension T2 is shorter than the second elongated dimension E2, and extends transversely thereto. The second elongated dimension E2 and the second short dimension T2 intersect at a second adaptor bore axis C2. In a non-binding example, the second elongated dimension E2 and the second short dimension T2 are perpendicular to one another.

It is noted that the cross sections of the first and second adaptor clamping bores 24, 26, may be of an oblong or oval shape, having defined elongated and shorter dimensions, extending transversely to one another.

As indicated in FIG. 4, the first elongated dimension E1 of the first adaptor clamping bore 24, forms a non-zero clamping bore angle β with the second elongated dimension E2 of the second adaptor clamping bore 26.

According to certain embodiments of the present invention, the clamping bore angle β equals 90°, so that the first elongated dimension E1 and the second elongated dimension E2 are perpendicular to one another.

Figure 6:
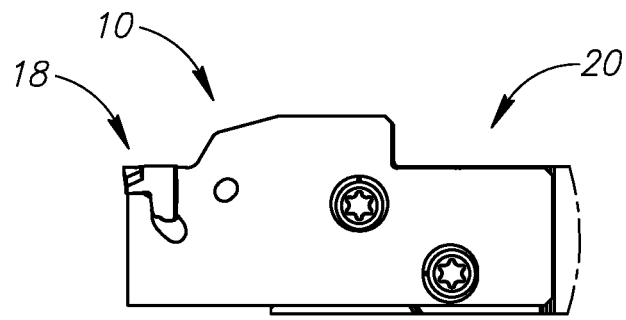
FIG. 6 is a side plan view of the turning tool of FIG. 1.
Figure 7:
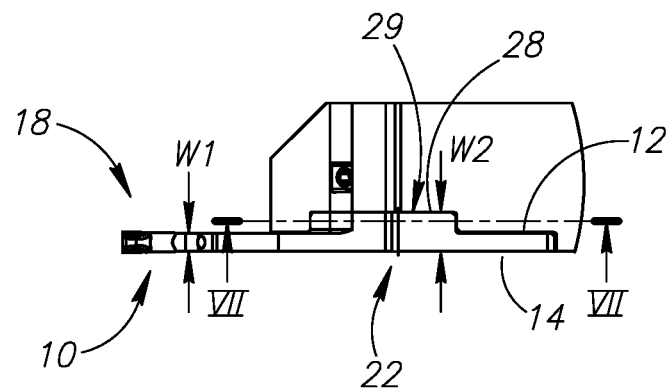
FIG. 7 is a top view of the turning tool of FIG. 1.

Referring in addition to FIGS. 6-8, the cutting tool 50 further includes a first fastener 60 and a second fastener 62. The first and second fasteners 60, 62, may typically be threaded screws. For clamping the turning tool adaptor 10 to the tool holder body 52, the first fastener 60 passes through the first adaptor clamping bore 24 and into the first body clamping bore 56. Similarly, the second fastener 62 passes through the second adaptor clamping bore 26 and into the second body clamping bore 58.

As indicated in FIG. 8, when the turning tool adaptor 10 is clamped to the tool holder body 52, the first adaptor clamping bore 24 and the first body clamping bore 56 are in an eccentric relation. That is to say, the first adaptor bore axis C1 extends parallel to the first body bore axis A1, and spaced apart there from.

Similarly, the second adaptor clamping bore 26 and the second body clamping bore 58 are in an eccentric relation. That is, the second adaptor bore axis C2 is parallel to the second body bore axis A2 and spaced apart there from.

In the cross-section of FIG. 8, the turning tool adaptor 10 is in an assembled position, and the first and second fasteners 60, 62 have been tightened. The main abutment surface 28 abuts the adaptor receiving surface 55. The first, second and third abutment surfaces 30, 32, 34 abut respectively the first, second and third receiving surfaces 70, 72, 74. The only engagement, or abutment, between the turning tool adaptor 10 and the tool holder body 54 in a direction perpendicular to the longitudinal axis L, occurs between the main abutment surface 28 and the adaptor receiving surface 55.

Due to the abovementioned eccentricity, each fastener applies an eccentric clamping force onto the turning tool adaptor 10 in a direction of eccentricity defined between the respective eccentric axes.

As shown in FIG. 8, a first eccentric force F1 is directed in a downward direction D towards the bottom surface 42. A straight extension of the first eccentric force F1 intersects the first adaptor bore axis C1 and the first body bore axis A1.

A second eccentric force F2 is directed in the rearward direction DR, transversely to the downward direction D. A straight extension of the second eccentric force F2 intersects the second adaptor bore axis C2 and the second body bore axis A2.

Furthermore, the first eccentric force F1 is directed in the direction of the first short dimension T1 and the second eccentric force F2 is directed in the direction of the second short dimension T2. The elongated shape of the adaptor clamping bores is advantageous in that it helps improve abutment location and force-directionality.

The eccentric first and second forces F1, F2 apply a counter clockwise torque T, as illustrated in FIG. 8. The torque T enables an at least partially-pivotal displacement of the turning tool adaptor 10 in the counter clockwise direction, which improves stability and securement of the turning tool adaptor 10 within the insert retaining portion 20. Specifically, tightening the fasteners works as a cocking, or pre-tensioning, mechanism which positively locates and locks the respective abutment surfaces of the turning tool adaptor 10 against the respective receiving surfaces of the insert retaining portion 20.

The main purpose, and advantage, of the elongated shape of the adaptor clamping bores 24, 26 is to allow some relative displacement, and/or pivotal and/or rotational freedom of movement between the fasteners 60, 62 and the adaptor clamping bores 24, 26 within the insert retaining portion 20. The elongated shape helps locate and determine directionality of the above mentioned pivotal-movement and forces.

In FIG. 8, a dashed line represents the insert's 36 shape and approximate location of its cutting edge. During machining operations of the turning tool 50, a component of machining forces MF (stemming from the cutting edge) is directed in the downward direction D. The machining forces MF help further improve and strengthen the abutment and securement of the turning tool adaptor 22 in insert retaining portion 20 by further increasing the amount of torque T which is applied to the turning tool adaptor 10.

Another important advantage of the current coupling arrangement is its compact design. Namely, the first, second and third abutment surfaces 30, 32, 34 are all located on the clamping portion 22, between the top and bottom surfaces 40, 42. Furthermore, the first and second adaptor clamping bores 24, 26 are also located within the clamping portion 22, between the top and bottom surfaces 40, 42. Among other advantages, this means that the entire bottom surface 42 can be devoid of overhangs, and that it can be a planar surface. In some smaller-volume machines, this can be an important advantage given that most modular turning tools are bulky and include top and bottom overhangs. It is noted, that in an assembled position, the turning tool also is devoid of overhangs protruding from its bottom surface.

Even further, the top surface 40 preferably includes an optional coolant conveying protrusion 76. However, if the application does not require coolant conveyance, the top surface 40 can also be planar.

What is claimed is:

1. A replaceable turning tool adaptor (10) having a longitudinal axis (L) defining a forward-to-rear direction ($D_F$, $D_R$), and comprising:
   an adaptor forward end (15) and an adaptor rear end (17) spaced apart from one another along the longitudinal axis (L);
   opposite first and second side surfaces (12, 14) and a peripheral surface (16) extending therebetween;
   a forward cutting portion (18) comprising an insert retaining portion (20); and
   a clamping portion (22) located rearward of the cutting portion (18), the clamping portion (22) comprising:
      opposite top and bottom surfaces (40, 42) extending between the first side surface (12) and a main abutment surface (28) which extends parallel to the second side surface (14); and
      a protrusion (29) extending transversely from the first side surface (12), and comprising:
         the main abutment surface (28);
         first and second adaptor clamping bores (24, 26) opening out to the second side surface (14) and to the main abutment surface (28);
         a first abutment surface (30) facing in an upward direction (U), away from the bottom surface (40);
         a second abutment surface (32) extending parallel to, and located forward of, the first abutment surface (30); and
         a third abutment surface (34) located rearward of the first abutment surface (30), and forming a non-zero surfaces angle ($\alpha$) therewith,
   wherein:
      the first, second and third abutment surfaces (30, 32, 34) are located between the top and bottom surfaces (40, 42) in a side view perpendicular to the main abutment surface (28); and
      the entire second abutment surface (32) is located forward of the first abutment surface (30), in a direction along the longitudinal axis (L).

2. The turning tool adaptor (10) according to claim 1, wherein the first, second and third abutment surfaces (30, 32, 34) are all located between the second side surfaces (14) and the main abutment surface (28) in a side view perpendicular to the main abutment surface (28).

3. The turning tool adaptor (10) according to claim 1, wherein the first, second and third abutment surfaces (30, 32, 34) are all located between the first side surfaces (12) and the main abutment surface (28) in a direction perpendicular thereto.

4. The turning tool adaptor (10) according to claim 1, wherein each of the first and second adaptor clamping bores (24, 26) has a corresponding adaptor bore axis (C1, C2) and an elongated, non-circular cross section perpendicular to said corresponding adaptor bore axis (C1, C2).

5. The turning tool adaptor (10) according to claim 1, wherein the first, second and third abutment surfaces (30, 32, 34) are perpendicular to the main abutment surface (28).

6. The turning tool adaptor (10) according to claim 1, wherein:
   the protrusion (29) has first and second abutment grooves (25, 27); and
   the first abutment surface (30) is located in the first abutment groove (25) and the second abutment surface (32) is located in the second abutment groove (27).

7. The turning tool adaptor (10) according to claim 1, wherein the surfaces angle ($\alpha$) is larger than 90 degrees.

8. The turning tool adaptor (10) according to claim 1, wherein:
   the top surface (40) and the bottom surface (42) are parallel to one another; and
   the first abutment surface (30) is located closer to the top surface (40) than to the bottom surface (42).

9. The turning tool adaptor (10) according to claim 1, wherein:
   the cutting portion (18) has a first width (W1) which is measured between the first and second side surfaces (12, 14) in a direction perpendicular thereto;
   the clamping portion (22) has a second width (W2) measured between the second side surface (14) and the main abutment surface (28); and
   the first width (W1) is smaller than the second width (W2).

10. A modular turning tool (50) comprising:
    a tool holder body (52); and
    the turning tool adaptor (10) according to claim 1 coupled thereto via a plurality of fasteners (60, 62).

11. The turning tool (50) according to claim 10, wherein the tool holder body (52) comprises first, second and third receiving surfaces (70, 72, 74) which extend perpendicularly from an adaptor receiving surface 55.

12. The turning tool (50) according to claim 10, wherein the tool holder body (52) comprises an adaptor receiving portion (54) which comprises:
    a first receiving surface (70);
    a second receiving surface (72) extending parallel to, and located forward of, the first receiving surface (70); and
    a third receiving surface (74) located rearward of the first receiving surface (70), and forming a non-zero receiving angle ($\gamma$) therewith.

13. The turning tool (50) according to claim 12, wherein:
    the first abutment surface (30) abuts the first receiving surface (70);
    the second abutment surface (32) abuts the second receiving surface (72); and
    the third abutment surface (34) abuts the third receiving surface (74).

14. A replaceable turning tool adaptor (10), having a longitudinal axis (L) defining a forward-to-rear direction ($D_F$, $D_R$), and comprising:
    an adaptor forward end (15) and an adaptor rear end (17) spaced apart from one another along the longitudinal axis (L);
    a first side surface (12), a second side surface (14), and a peripheral surface (16) extending therebetween;
    a cutting portion (18) comprising an insert retaining portion (20); and
    a clamping portion (22), extending from the cutting portion (18), and comprising a protrusion (29) extending transversely to the longitudinal axis (L) from the first side surface (12), the protrusion (29) comprising a first adaptor clamping bore (24) and a second adaptor clamping bore (26) spaced apart therefrom, the adaptor clamping bores (24, 26) having respective adaptor bore axes (C1, C2) and opening out to the protrusion (29) and to the second side surface (14);

wherein the first and second adaptor clamping bores have (24, 26) elongated, non-circular cross sections perpendicular to said respective adaptor bore axes (C1, C2).

15. The turning tool adaptor (10) according to claim 14, wherein the clamping portion (22) further includes:
a first abutment surface (30);
a second abutment surface (32) extending parallel to, and located forward of, the first abutment surface (30); and
a third abutment surface (34) located rearward of the first abutment surface (30) and forming a non-zero surfaces angle (α) therewith.

16. The turning tool adaptor (10) according to claim 15, wherein the surfaces angle (α) is larger than 90 degrees.

17. The turning tool adaptor (10) according to claim 15, wherein:
the peripheral surface (16) has a top surface (40) and a bottom surface (42), which in a side view of the turning tool adaptor (10) are located on opposite sides of the longitudinal axis (L); and
the first abutment surface (30) is parallel to the top surface (40), and located between the top surface (40) and a longitudinal extension (38) of the second abutment surface (32).

18. The turning tool adaptor (10) according to claim 17, wherein:
the top surface (40) and the bottom surface (42) are parallel to one another; and
the first abutment surface (30) is located closer to the top surface (40) than to the bottom surface (42).

19. The turning tool adaptor (10) according to claim 14, wherein:
the first adaptor clamping bore (26) has a non-cylindrical first cross section defining a first elongated dimension (E1) and a transverse first short dimension (T1), which is shorter than the first elongated dimension (E1); and
the second adaptor clamping bore (26) has a non-cylindrical second cross section defining a second elongated dimension (E2) and a transverse second short dimension (T2), which is shorter than the second elongated dimension (E2).

20. The turning tool adaptor (10) according to claim 19, wherein the first elongated dimension (E1) forms a non-zero clamping bore angle (β) with the second elongated dimension (E2).

21. The turning tool adaptor (10) according to claim 20, wherein the clamping bore angle (β) equals 90 degrees.

22. The turning tool adaptor (10) according to claim 19, wherein:
the first elongated dimension (E1) and the first short dimension (T1) intersect at a first adaptor bore axis (C1); and
the second elongated dimension (E2) and the second short dimension (T2) intersect at a second adaptor bore axis (C2).

23. The turning tool adaptor (10) according to claim 14, wherein:
the cutting portion (18) has a first width (W1) which is measured between the first and second side surfaces (12, 14) in a direction perpendicular thereto;
the clamping portion (22) has a second width (W2) measured between the second side surface (14) and the main abutment surface (28); and
the first width (W1) is smaller than the second width (W2).

24. The turning tool adaptor (10) according to claim 14, wherein:
the peripheral surface (16) has a top surface (40) and a bottom surface (42), which are located on opposite sides of the longitudinal axis (L); and in a direction perpendicular to the longitudinal axis (L) the adaptor clamping bores (24, 26) are located between the top and bottom surfaces (40, 42).

25. A modular turning tool (50) comprising:
a tool holder body (52); and
the turning tool adaptor (10) according to claim 14 coupled thereto via a plurality of fasteners (60, 62).

26. The turning tool (50) according to claim 25, wherein the tool holder body (52) comprises first, second and third receiving surfaces (70, 72, 74) which extend perpendicularly from an adaptor receiving surface (55).

27. The turning tool (50) according to claim 25, wherein the tool holder body (52) comprises an adaptor receiving portion (54) which comprises:
a first receiving surface (70);
a second receiving surface (72) extending parallel to, and located forward of, the first receiving surface (70); and
a third receiving surface (74) located rearward of the first receiving surface (70) and forming a non-zero receiving angle (γ) therewith.

28. The turning tool (50) according to claim 27, wherein:
the first abutment surface (30) abuts the first receiving surface (70);
the second abutment surface (32) abuts the second receiving surface (72); and
the third abutment surface (34) abuts the third receiving surface (74).

29. The turning tool adaptor (10) according to claim 1, wherein:
the first, second and third abutment surfaces (30) are spaced apart from the top and bottom surfaces (40, 42), in a view perpendicular to the main abutment surface (28).

30. The turning tool adaptor (10) according to claim 1, wherein:
the third abutment surface (34) is rearward of both the first and second abutment surfaces (30), in a view perpendicular to the main abutment surface (28).

31. The turning tool adaptor (10) according to claim 15, wherein:
the first, second and third abutment surfaces (30) are spaced apart from the peripheral surface (16), in a side plan view of the turning tool adaptor (10).

32. The turning tool adaptor (10) according to claim 15, wherein:
the third abutment surface (34) is rearward of both the first and second abutment surfaces (30), in a view perpendicular to the main abutment surface (28).

33. The turning tool adaptor (10) according to claim 4, wherein:
the first adaptor clamping bore (26) has a non-cylindrical first cross section defining a first elongated dimension (E1) and a transverse first short dimension (T1), which is shorter than the first elongated dimension (E1);
the second adaptor clamping bore (26) has a non-cylindrical second cross section defining a second elongated dimension (E2) and a transverse second short dimension (T2), which is shorter than the second elongated dimension (E2); and the first elongated dimension (E1) forms a non-zero clamping bore angle ($\beta$) with the second elongated dimension (E2).

34. The turning tool (50) according to claim 13, wherein:
the third abutment surface (34) abuts the third receiving surface (74) at a location lower than the first receiving surface (70) and higher than the second receiving surface (72).

35. The turning tool (50) according to claim 28, wherein:
the third abutment surface (34) abuts the third receiving surface (74) at a location lower than the first receiving surface (70) and higher than the second receiving surface (72).

\* \* \* \* \*